D. H. CHAMBERLAIN.
BANDING PULLEYS FOR DRIVING SAWS.
No. 10,374. Patented Jan. 3, 1854.
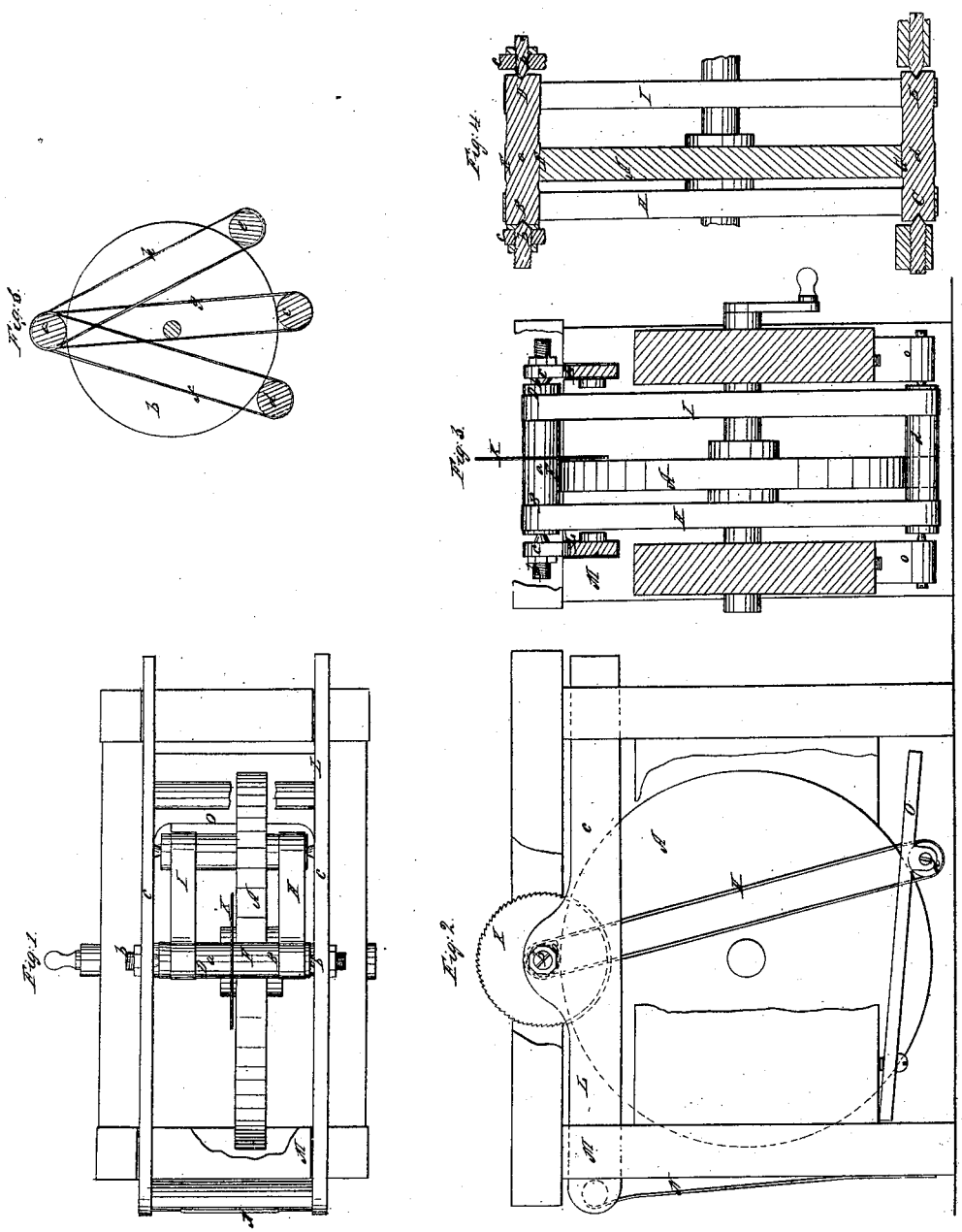

UNITED STATES PATENT OFFICE.

D. H. CHAMBERLAIN, OF BOSTON, MASSACHUSETTS, ASSIGNOR TO CHAMBERLAIN & HUNT.

MODE OF BANDING PULLEYS FOR SAWS.

Specification of Letters Patent No. 10,374, dated January 3, 1854.

*To all whom it may concern:*

Be it known that I, DEXTER H. CHAMBERLAIN, of Boston, in the county of Suffolk and State of Massachusetts, have invented a new and useful Mode of Banding Pulleys for Saws, &c., or, in other words, a Mode of Driving the Shaft of a Circular Saw or other Piece of Mechanism; and I do hereby declare that the same is fully described and represented in the following specification and the accompanying drawings, letters, figures, and references thereof.

Of the said drawings Figure 1, denotes a top view. Fig. 2, a side elevation, and Fig. 3, a front end view, of my invention as applied to the shaft of a circular saw.

In the said drawings, K, exhibits a circular saw, whose shaft, a, may be a cylinder supported at its two ends on pivot or centering screws, b, b, that respectively pass through the rails c, c, of a frame, L, that rests and slides freely in a longitudinal direction on or in the main saw frame or bench M, such frame, L, being made to abut against a spring, N, should occasion require the same. The shaft, a, is made to rest on the periphery of a large driving pulley or wheel A.

Underneath the wheel, A, and placed in contact with it, and at about one hundred and forty degrees distant from the shaft, a, is another cylindrical shaft or drum, d, which is made to project over or beyond each side of the driving wheel, and be supported within a movable bar, board, or frame, O, so that it can freely revolve on its axis. Two endless belts H, I, are made to work around the two shafts or drums, a, and, d, and are disposed on opposite sides of the driving wheel as seen in the drawings. They are not placed or made to run in contact with the periphery of the driving wheel. Those parts of the shaft a, d around which the belts work may be considered as pulleys and may be designated by the letters B, C and D, E, while those parts which rest in contact with the periphery, of the driving wheel may also be considered as pulleys and designated as the two bearing pulleys, F, G. This arrangement is shown in Fig. 1, which is a section of all of them. This being the position of things, if the conical recesses of the shaft, a, that the pivot screws enter, are made large enough to permit the shaft or the bearing pulley, F, thereof to rest directly on the driving wheel, the endless belts will draw the other shaft, d, or its bearing pulley, G, close up against the periphery of the driving wheel. The pressure of the pulleys against the periphery of the driving wheel may be increased by moving the frame, L, in a direction toward the spring, N. Such pressure may be diminished by moving the said frame in an opposite direction.

Now it is not essential to the main principle of my invention, that there should be two endless belts running around the two shafts, a, d, and on opposite sides of the driving wheel, as one such belt only may be used, provided the shafts are provided with bearings or pivots to keep them in place, and allow the belts to draw the two shafts, or their bearing pulleys toward and against the periphery of the driving pulley or wheel. And I would also remark, that there may be two or more such endless belts going down on one side of the driving pulley, and made not only to work around the shaft, a, or so many pulleys thereon, but also and respectively around separate shafts bearing or having bearing pulleys to bear against the opposite or lower part of the periphery of the driving wheel.

Fig. 5, is a sketch serving to illustrate this latter arrangement, in which, a, may be supposed to be the shaft to be driven; b, the driving wheel; d, c, e, three bearing shafts having endless bands f, g, h, extended around them respectively, and the shaft, a. With such an arrangement the friction or power tending to rotate the shaft a, will be greatly increased, and in or about in the proportion of the number of belts used. By the employment of belts on the opposite sides of the driving wheel at one and the same time as shown at H, I, in Fig. 1, the strain of the belts is removed from both the pivots of the shaft, the shaft being made to rest on the periphery of the driving wheel.

My method of banding wheels or driving a shaft has a decided advantage over the plan invented by Robert W. Parker and patented on or about the seventeenth day of March A. D. 1852, for in the said Parker's plan, the belt is pinched between the driving and driven wheels and is thereby flattened or spread out as a piece of metal would be, when run between reducing rollers. By being so acted on it soon becomes very much injured, its fibers being more or less crushed and broken. As my belts (or neither of them) neither run nor are pinched between rollers they are not liable to any such action or injury.

My invention also possesses decided advantages over that arrangement of three rollers where one is placed between and against the peripheries of the other two, and the endless belt is made to traverse around the two outer rollers. One of which is the driving while the other is the driven roller.

I do not claim the combination of three pulleys (viz. a driving pulley and two others) and an endless belt; nor do I claim the application and arrangement of such wherein the belt runs against or on the periphery of the driving pulley or wheel, and is strained between the two pulleys and pinched between them and the driving pulley; nor do I claim an arrangement wherein one of the driven pulleys or rollers is placed between and in contact with the peripheries of the driving and other driven pulleys, while the endless belt is made to play around the two external pulleys, whereby the axles or journals of the driving and driven pulleys are relieved from friction caused by the contractile power or strain of the band, such strain being borne by the pulleys, but What I do claim as my invention is—

1. My improved arrangement of pulleys and endless belt whereby the driven pulley is sustained on the periphery of the driving wheel or pulley, the same consisting in placing the peripheries of the two lesser pulleys in contact with the periphery of the driving wheel and so as to extend beyond the side thereof and running the endless belt around the extensions of the said two pulleys and down by the side of the driving wheel and without any pressure or contact with its periphery, the whole being substantially as specified.

2. And I also claim the combination of two endless belts (arranged on opposite sides of the driving wheel) with the bearing and belt pulleys or their equivalents, and the driving wheel as made to operate together substantially as described, the same enabling me to relieve the bearings of the shafts of the several pulleys from the contractile strain of the belts.

3. And I also claim the improvement of arranging two or more endless belts on one side of the driving wheels and not only running all of the said belts around one shaft or drum (or the equivalent) supported on the periphery of the driving wheel, but respectively around other shafts or drums or equivalents arranged and supported on the opposite portion of the periphery thereof, the whole being as exhibited in Fig. 5 and as above specified.

In testimony whereof I have hereto set my signature this sixteenth day of July A. D. 1853.

D. H. CHAMBERLAIN.

Witnesses:
R. H. EDDY,
FRANCIS P. HALE, Jr.